April 18, 1961 E. A. VERRINDER 2,979,872
METHOD OF AND APPARATUS FOR LOADING PALLETS
Filed Sept. 28, 1956 4 Sheets-Sheet 1
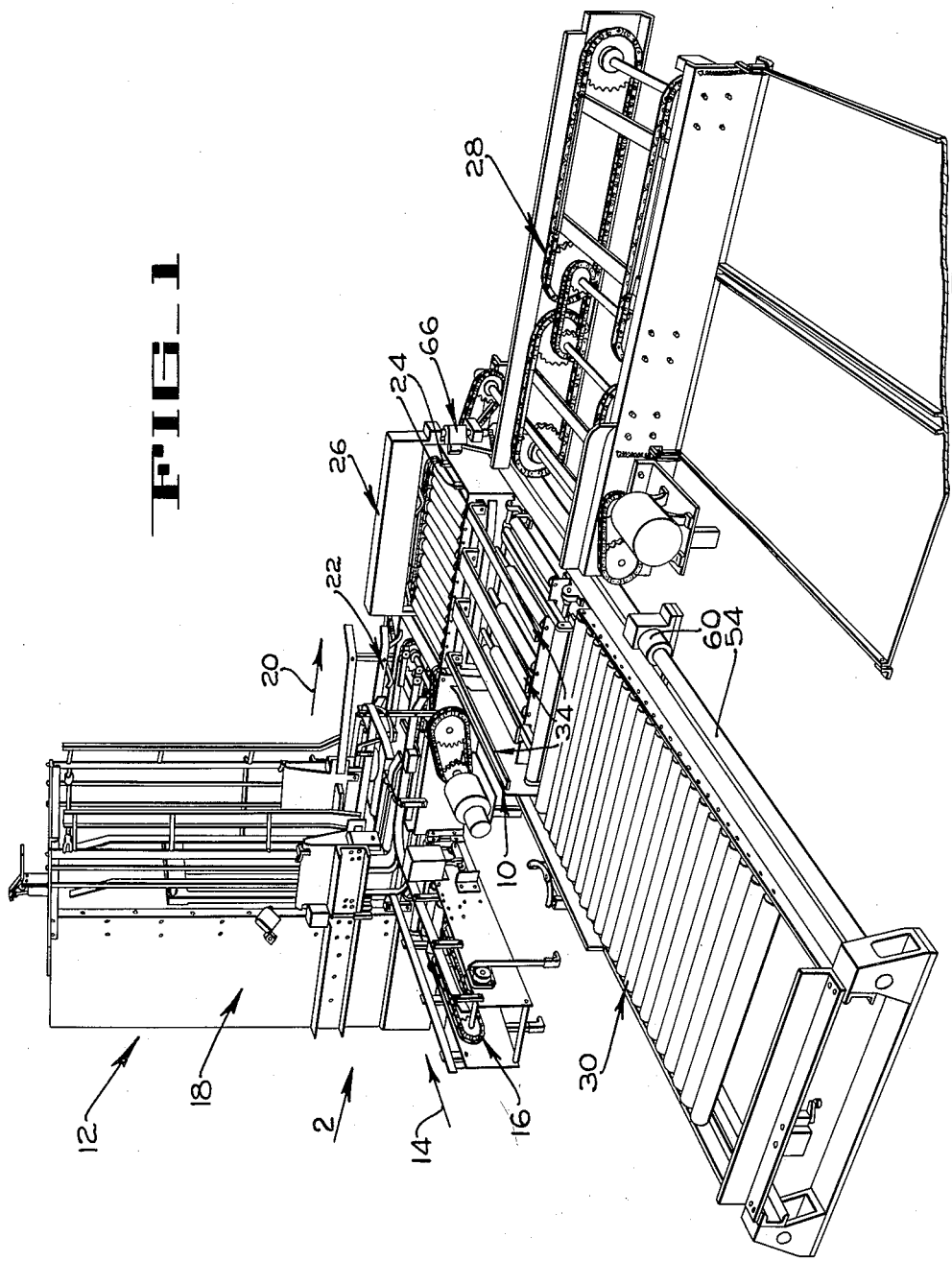
FIG_1
INVENTOR
ERNEST A. VERRINDER
BY *Hans G. Hoffmeister*
ATTORNEY

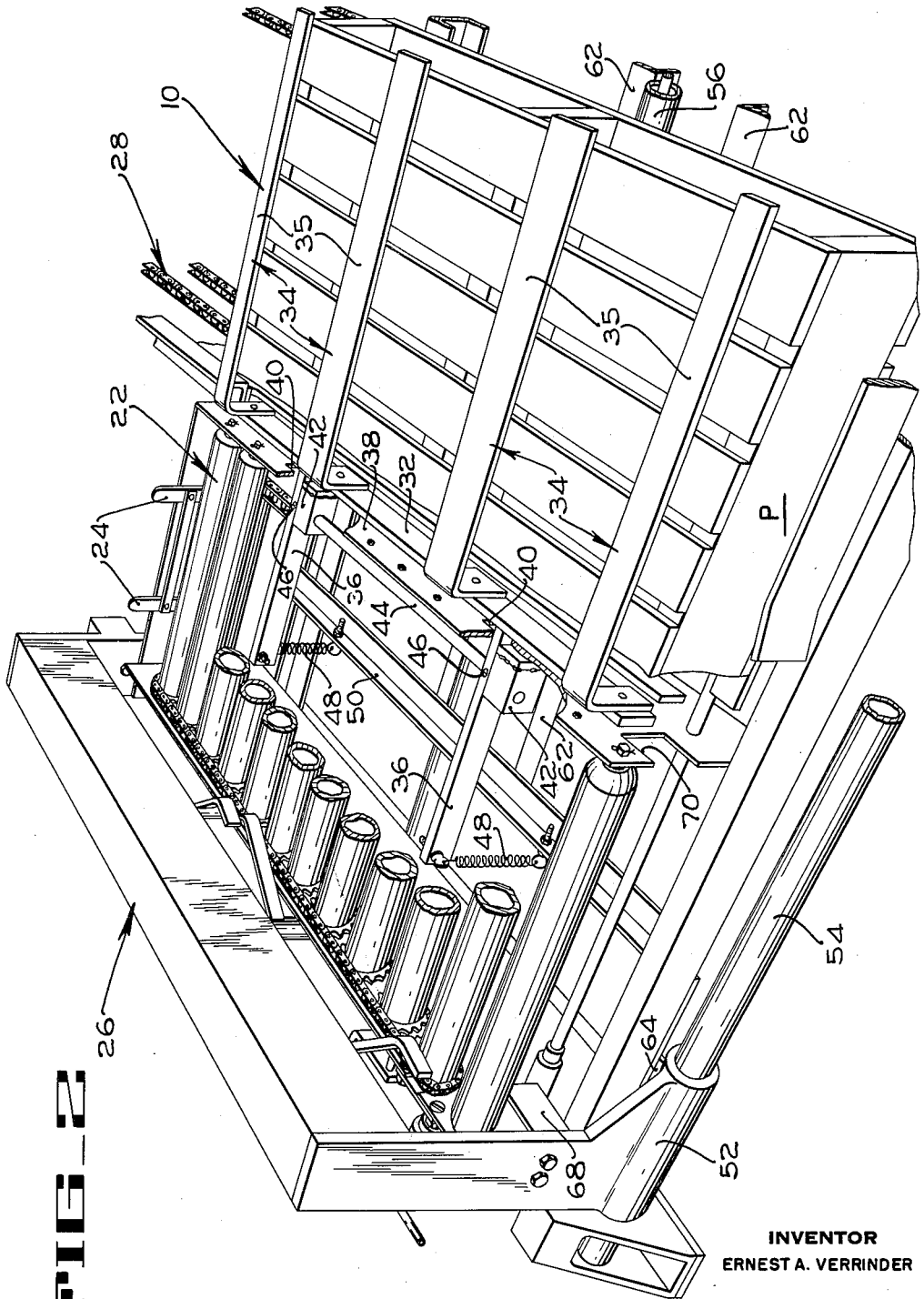

April 18, 1961   E. A. VERRINDER   2,979,872
METHOD OF AND APPARATUS FOR LOADING PALLETS
Filed Sept. 28, 1956   4 Sheets-Sheet 3
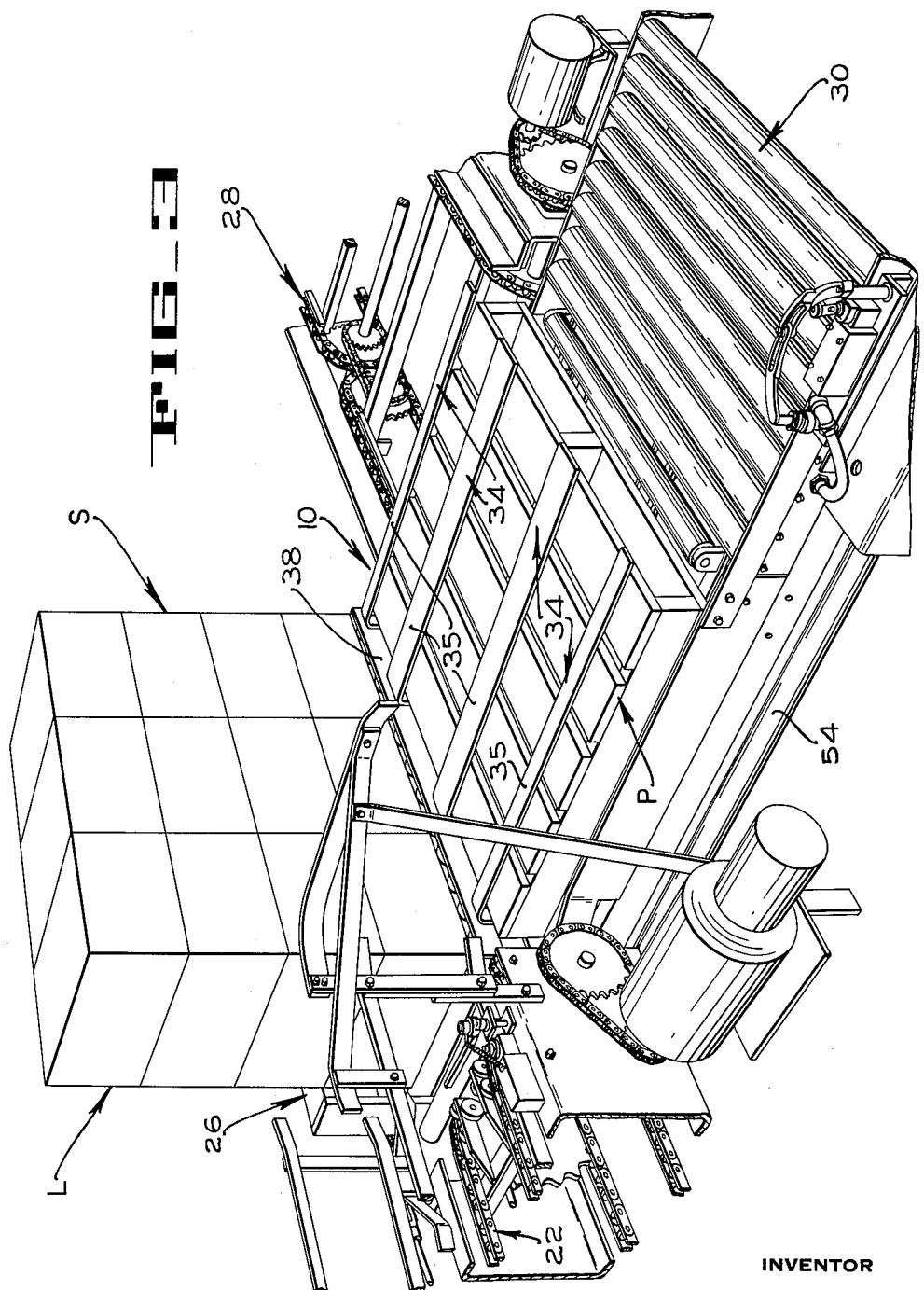
FIG_3
INVENTOR
ERNEST A. VERRINDER
BY *Hans G. Hoffmeister*
ATTORNEY

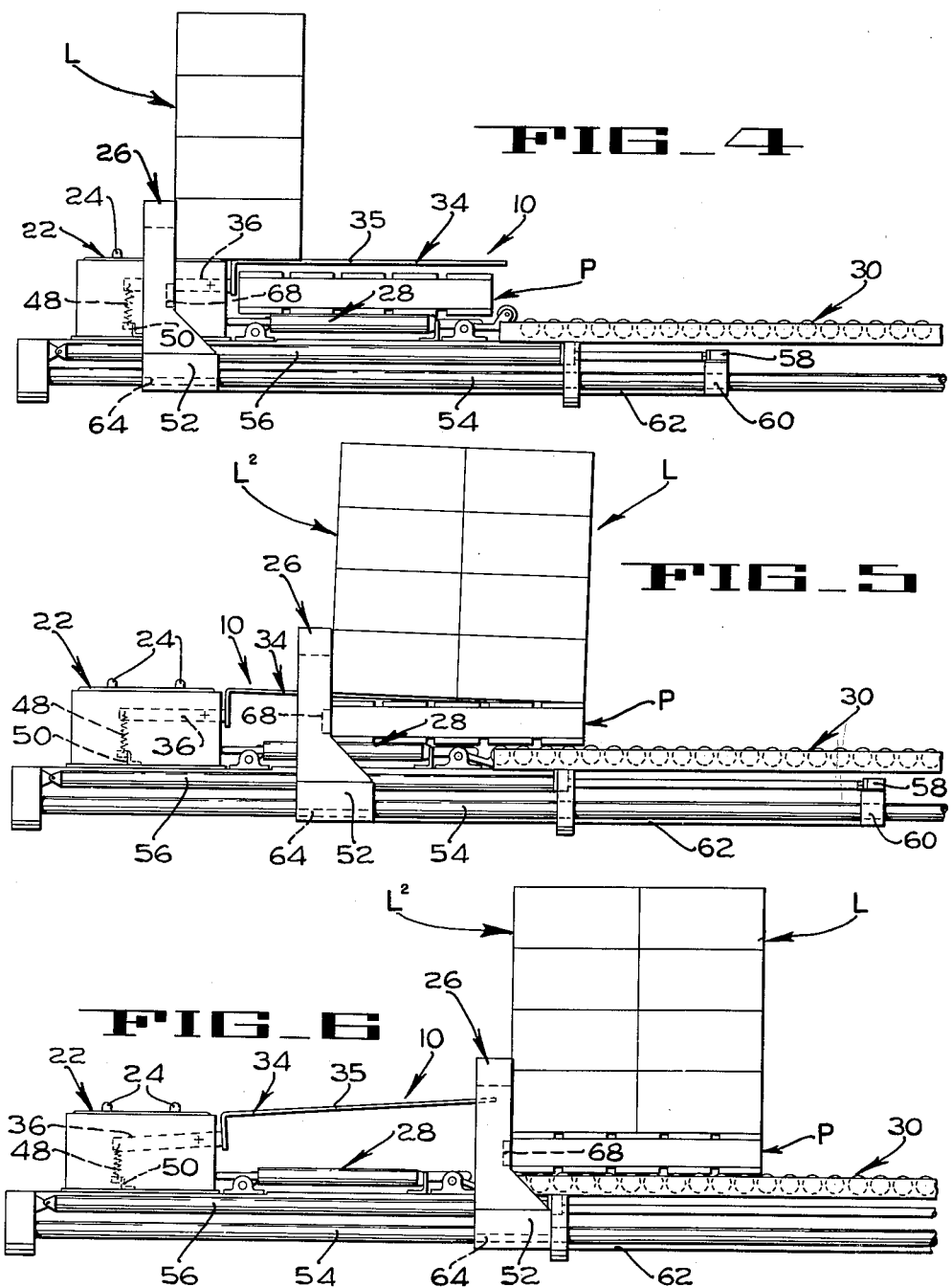

United States Patent Office 2,979,872
Patented Apr. 18, 1961

2,979,872

METHOD OF AND APPARATUS FOR LOADING PALLETS

Ernest A. Verrinder, Riverside, Calif., assignor to Food Machinery and Chemical Corporation, San Jose, Calif., a corporation of Delaware Filed Sept. 28, 1956, Ser. No. 612,668

16 Claims. (Cl. 53—26)

This invention relates generally to apparatus for handling shipping containers such as cases, cartons, boxes and like articles and more particularly appertains to a method of transferring a load of such articles onto a pallet and the apparatus for performing such an operation.

Manufactures of such items as canned goods and beverages find it advantageous to assemble specific quantities of their cased product in loads on warehouse pallets that may be easily handled by fork-lift trucks for movement into storage areas or into freight cars or trucks for shipment to distant points. In many case handling machines currently used in loading pallets, a load is formed on the pallet by sliding rows of stacked cases onto the pallet. Damage to both the cases and the pallet is a frequent occurrence when a pallet is loaded in this manner. In order to overcome the problem of damage to the cases and pallets caused by this manner of loading, metal straps or plates are usually applied to the faces of the pallets to provide a smooth sliding surface. This is an expensive solution to the problem, particularly if the pallets are to be shipped away with the product instead of being retained within a specific plant for repeated use. The stripper plate of the present invention overcomes the need of applying straps or plates to the pallets and prevents damage during pallet loading operations to both the cases and pallets.

It is one object of the present invention to provide an efficient method of accumulating a pallet load of articles and then transferring the entire load onto a pallet without any relative sliding movement occuring between the load and the pallet.

Another object of the present invention is to provide, in a case handling machine, means for protecting shipping cases as well as the pallets onto which the cases are loaded from wear and damage during pallet loading.

Another object is to provide a stripper plate which is not moved with either the cases or the pallets during pallet loading.

Another object is to provide a stripper plate for use in case handling machines that, while not moved with either the cases or the pallets in the machine, will not hinder movement of the pallets into or out of the machine or movement of the cases onto the pallet.

Another object is to provide a stripper plate that is simple in construction and easy to install in or remove from a case handling machine.

These and other objects and advantages of the present invention will become apparent from the following detailed description and accompanying drawings, wherein:

Fig. 1 is a perspective view of a case handling machine embodying the stripper plate of the present invention.

Fig. 2 is an enlarged fragmentary perspective, partly broken away, of the machine shown in Fig. 1, as viewed in the general direction of the arrow 2 thereof.

Fig. 3 is an enlarged fragmentary perspective also viewed in the general direction of the arrow 2 of Fig. 1 and showing an operational position preceding the pallet loading.

Figs. 4, 5 and 6 are diagrammatic elevations, partly broken away, of a portion of the case handling machine including the stripper plate and showing successive stages in the operation of loading articles onto the pallet.

Referring first to Fig. 1 the machine shown generally therein is illustrative of a case handling machine shown and described in detail in the copending application of Ernest A. Verrinder et al., Serial No. 521,011, for a Method of and Apparatus for Handling Cases. While the machine of the copending application may be used to perform pallet unloading, pallet loading or a combination unloading-loading operation, the stripper plate 10 (Figs. 1 and 2) of the present invention can be used on this machine during pallet loading operations only. The stripper plate 10 is constructed in such a way that it may be easily installed in or removed from the case handling machine of application Serial No. 521,011 and may be considered in that regard as an attachment for occasional use on such a machine. It is possible under some circumstances, however, that the machine of the above-mentioned application might be altered so as to perform only pallet loading operations and in such event the stripper plate would be incorporated as an integral part of the pallet loading machine.

In the present disclosure the stripper plate 10 will be illustrated as attached to the machine of application Serial No. 521,011 and it will be understood that the machine of the copending application and the present case handling machine 12 (Fig. 1) are constructed and arranged to operate in a similar manner to load cases on a pallet. In the event that a more thorough understanding of the case handling machine 12 may be desired, reference may be made to the application above mentioned.

During use of the stripper plate 10 on the machine 12 (Fig. 1) the controls thereof are set so that only pallet loading operations are performed by the machine. During this operation, single cases or similar articles, which are to be assembled into pallet loads, are carried in the direction of the arrow 14 on a feed conveyor 16 to a case stacking unit 18 where a predetermined number of such cases are stacked one upon another. When the proper number of cases have been stacked, appropriate controls (not shown) are actuated, blocking delivery of additional cases to the stacking unit 18 by the conveyor 16 and causing the completed stack to be moved from the stacking unit in the direction of arrow 20 by a stack conveyor 22. The first stack S (Fig. 3), that is moved from the stacker by the stack conveyor, is brought to a position against a pair of stops 24 (Figs. 1 and 2) located at the end of the stack conveyor remote from the stacking unit. The first stack of cases is detained by the stops 24 until a predetermined number of stacks of uniform heights have been formed in the stacker unit 18 and carried by the stack conveyor 22 to a position adjacent to and in alignment with the first stack S. When a line L (Figs. 3 and 4), including a predetermined number of stacks, is formed in the manner described, other controls (not shown) are actuated by the stacks causing a hydraulically operated pusher or ram 26 (Figs. 2 and 4) to shift the entire line L of stacks in a direction transversely of the stack conveyor 22 and onto the stripper plate 10, above an empty pallet P, which was previously positioned in predetermined location below the stripper plate 10 by a pallet conveyor 28 (Fig. 1). The pusher 26 is arranged to push the first line L of stacked cases onto the stripper plate 10 and then return to its original position on the side of the stack conveyor 22 remote from the stripper plate. When the second line $L^2$ (Figs. 5 and 6) of stacks has been formed on the stack conveyor 22, the ram 26 shifts the entire new line transversely of the stack conveyor, into contact with the first line L of stacks and onto the stripper plate. Line L is then pushed along in front of the new line L² by engagement therewith. When a predetermined number of lines of stacks have been assembled on the stripper plate to form a pallet load which is disposed in superposed relation to the pallet, the operating stroke of the ram is lengthened. Then, during the further movement of the ram, occasioned by its lengthened stroke, not only the rows of stacked cases forming the pallet load (Figs. 5 and 6) are engaged by the ram, but also the pallet is engaged in a manner to be described presently, so that both the load and the pallet are shifted as a unit toward and onto a gravity conveyor 30. It is to be particularly noted that the location of the stripper plate 10 remains unchanged during movement of the load and the pallet as a unit. As the load and the pallet, which as yet have not been in engagement with each other, are moved beyond the stripper plate the cases are transferred to the pallet from the stripper plate without any relative, sliding movement occurring between the cases and the pallet. All injury formerly sustained by both the cases and the pallets, caused by the sliding movement of the cases onto and along the surface of a pallet while forming a load thereon, is eliminated. When the entire pallet load has been transferred by the action of the ram from the stripper plate to the pallet and the pallet is on the gravity conveyor 30, the ram 26 is returned to its original position for succeeding pallet loading operations. The loaded pallet may be removed from the gravity conveyor 30 by any convenient means (not shown) such as by a forklift truck.

In the present disclosure the stripper plate will be illustrated as a platform which is made up of a series of flat straps so spaced that they are engaged by only the margin of the bottoms of the crates or boxes disposed thereon. It will, however, be termed a "stripper plate" because this is the name by which such devices are known in the trade and without any limitation as to whether the platform is in the form of a solid sheet or plate or is made up of a series of spaced apart straps.

The stripper plate 10 (Fig. 2) comprises a rigid bar 32 having a plurality of flat tines or straps 34 welded or otherwise secured to one side of the bar so as to project upwardly therefrom. At a suitable and uniform distance from the bar 32 each of the straps is given a right-angle bend so that each strap is in the form of a reclining L with the legs 35 of each strap projecting laterally of the bar over the pallet conveyor 28. Two short, rigid arms 36 (Fig. 2) are affixed to the bar 32 as by welding and project laterally from the side of the bar 32 in a direction opposite to the legs 35 of the straps 34. When the stripper plate is installed in the case handling machine 12, the bar 32 is disposed above the pallet conveyor 28 at the side of the stack conveyor 22 adjacent a vertical side plate 38 which forms a part of the stack conveyor. Suitable apertures 40 (Fig. 2) are provided in the plate 38 to receive the arms 36 of the stripper plate in spaced relationship with the walls of the apertures. In order to pivotally mount the stripper plate 10, a pair of bearing blocks 42 are secured to the inner side of the plate 38 adjacent the apertures 40 and the arms 36 to pivotally receive a shaft 44 to which the arms 36 of the stripper plate are affixed as by set screws 46. It will be noted that the stripper plate is located in the case handling machine with the legs 35 of the straps 34 being disposed substantially in a plane with the case supporting surface of the stack conveyor 22. A tensile spring 48 of suitable length and strength (Fig. 2) is stretched between the free end of each arm 36 and an appropriate frame member 50 of the stack conveyor 22 so as to retain the legs 35 of the stripper plate 10 in predetermined raised position when not engaged by boxes or cases. The normally raised position of legs 35 of the stripper plate straps 34 (Fig. 6) assures that before the actual loading begins a pallet may be moved by the pallet conveyor 28 into position below the stripper plate without interference therefrom. During operation of the case loading machine 12, stacks of cases that have been formed into lines on the stack conveyor 22 are pushed therefrom by the ram 26 onto the straps 34 of the stripper plate 10.

The pusher or ram 26, which moves the lines of stacked cases from the stack conveyor 22 onto the stripper plate, 10, is mounted by means of sleeves 52 (only one of which is shown, Fig. 2) for reciprocatory movement upon a pair of guide rods 54 (Figs. 1 and 2). It will be understood from Figs. 4, 5 and 6 that the ram 26 is moved by means of a double acting hydraulic cylinder 56 the stroke of which can be varied as previously mentioned so that first a single line of stacked cases is pushed onto the stripper plate and then, when the last line of stacks of a pallet load is pushed onto the stripper plate, the stroke of the cylinder is lengthened so that both the pallet load as well as the pallet are pushed as a unit onto the gravity conveyor 30. The piston of the cylinder 56 is attached to a movable end 58 which in turn is affixed to a crosshead 60. In order to support and guide the crosshead 60 during reciprocation of the ram 26 the crosshead is mounted upon the rods 54. The crosshead 60 is connected to the ram 26 by means of two tie bars 62 (only one of which is shown Figs. 4, 5 and 6) which are secured, at one end, to opposite side portions of the crosshead, and at the other end to a rigid strap 64 that connects the sleeves 52 of the ram. A spring biased latch 66 (Fig. 1), which is pivotally attached to one end of the ram, rides along the end face of the stack conveyor 22 and drops in behind the pallet so that, during the above-mentioned lengthened stroke of the ram, the pallet is moved with the stacks as the stacks are pushed off the stripper plate onto the gravity conveyor. Engagement of the latch 66 at only one end of the pallet during movement thereof onto the gravity conveyor may cause the pallet to cant, resulting in misalignment of the pallet with the load. To prevent such an occurrence a pallet engaging bracket 68 (Fig. 2) is bolted to the ram 26 on the side thereof opposite to the latch 66. The plate 38 at the side of the stack conveyor 22 is notched as at 70 (Fig. 2) to permit passage of the bracket 68, upon movement of the ram, to engage and push the pallet. It is to be particularly noted that the bracket 68 must be removed from the ram 26 before use of the case handling machine 12 for pallet unloading operations.

In pushing the first line of stacks from the stack conveyor 22 onto the stripper plate 10 the entire stripper plate is tilted downwardly against the force of the springs 48, because of the pivotal mounting of the plate upon the shaft 44, until the free ends of the straps rest against the pallet P located therebelow on the pallet conveyor 28. As the pallet load of stacks is formed on the stripper plate 10 the straps which engage the pallet permit the greater portion of the weight of the load to rest upon the pallet by which downward pivotal movement of the plate 10 is limited. Therefore because most of the weight of each pallet load is borne directly by the pallet instead of the pivot shaft 44 the structure for mounting the stripper plate as well as the stripper plate itself can be constructed in a less rugged manner than would otherwise be required. After the pallet load is formed and the ram slides both the load and the pallet as a unit onto the gravity conveyor 30 and out of engagement with the stripper plate, the straps 34 of the stripper plate are swung, under the influence of the springs 48, to their raised position where they are resiliently retained out of the way of the next pallet P delivered by the pallet conveyor 28 into position below the stripper plate. The ram 26 is returned to its normal position at the side of the stack conveyor 22 opposite the stripper plate and the machine is ready for another pallet loading operation.

From the foregoing description it will be seen that the present invention provides apparatus for rapidly and efficiently loading articles such as cases onto pallets.

Damage to the cases and the pallet is prevented by assembling a load of cases upon the stripper plate, disposed above a pallet onto which the cases are to be loaded, and then moving both the load of cases and the pallet as a unit away from the stripper plate, during which movement the load is transferred directly to the pallet.

It will be understood that while the present embodiment of stripper plate illustrated in the drawings uses straps 34 which are engaged only by the bottoms of the cases adjacent their ends, the straps could be replaced by a plate and that other changes and modifications may be made within the scope of the present invention.

Having thus described my invention what I claim as new and desire to protect by Letters Patent is:

1. In a pallet loading machine the combination of, means for supporting a pallet in predetermined position, a load receiving stripper plate above said pallet support means and mounted for free pivotal movement about a fixed axis for movement downwardly when a load is placed thereon to contact and come to rest on the upper surface of a pallet disposed on said pallet support means, and load engaging means mounted for reciprocatory movement in a direction normal to the pivot axis of said load receiving stripper plate and movable over said plate between positions at opposite edges of said stripper plate for moving a load from said stripper plate.

2. In a pallet loading machine, pallet support means, pivotally mounted load receiving means disposed in superposed relation above said pallet support means, said load receiving means and said pallet support means being spaced apart a distance suitable for reception of a pallet on said support means below said load receiving means, said load receiving means being adapted for movement toward and away from said pallet support means, and counterbalance means associated with said load receiving means and adapted to resiliently hold said load receiving means in a normal position away from said pallet support means preparatory to receiving a load on said load receiving means and arranged to permit said load receiving means to move down into supported contact with the pallet when a load is placed on said load receiving means.

3. In a pallet loading machine, pallet support means, pivotally mounted load receiving means disposed in spaced superposed relation above said pallet support means, said load receiving means being adapted for movement toward and away from said pallet support means, counterbalance means associated with said load receiving means and adapted to resiliently hold said load receiving means in a position pivoted away from said pallet support means, and reciprocable means engageable with both the load and the pallet for effecting simultaneous movement thereof in a common direction away from said load receiving means to thereby transfer the load from said load receiving means to the pallet.

4. In a pallet loading machine, pallet support means, pivotally mounted load receiving means disposed in superposed relation above said pallet support means, said load receiving means and said pallet support means being spaced apart a distance suitable for reception of a pallet on said support means below said load receiving means, said receiving means being movable toward and away from said support means, counterbalance means associated with said load receiving means and being adapted to resiliently hold said load receiving means in a normal position pivoted away from said pallet support means, and means effecting relative lateral movement between said load receiving means and both a load on said load receiving means and a pallet on said support means to thereby remove said load receiving means from between the load and the pallet.

5. In a machine for loading articles onto a pallet the combination of, a pallet supply conveyor, a load receiving stripper plate disposed above said supply conveyor a distance suitable for reception of a pallet on said conveyor below said stripper plate, an article conveyor disposed laterally adjacent said load receiving stripper plate, an article stop associated with said article conveyor for positioning articles thereon in alignment with said stripper plate, and ram means engageable with aligned articles on said article conveyor and with a pallet on said pallet conveyor for moving both the articles and the pallet as a unit laterally beyond said load receiving stripper plate.

6. In a pallet loading machine, pallet support means, load receiving means disposed in superposed relation above said pallet support means, said load receiving means and said pallet support means being spaced apart a distance suitable for reception of a pallet on said support means below said load receiving means, article delivery means disposed laterally adjacent said load receiving means, an article stop associated with said article delivery means for positioning articles thereon in alignment with said load receiving means, and a reciprocably mounted article and pallet engaging means movable across said article delivery means and across said load receiving means and arranged to engage articles on said article delivery means and a pallet on said pallet support and move the articles and the pallet to a point beyond said load receiving means.

7. In a pallet loading machine, a pallet support, pivotally mounted load receiving means disposed in superposed relation above said pallet support, article delivery means disposed laterally adjacent said load receiving means, said pallet support being adapted for reception of a pallet thereon between said pallet support and said load receiving means, counterbalance means associated with said load receiving means and adapted to resiliently support said load receiving means in predetermined position, and a reciprocably mounted article and pallet engaging means movable across said article delivery means and said load receiving means to a point beyond said load receiving means.

8. The method of loading articles onto a pallet comprising the steps of, moving a pallet edgewise into predetermined article receiving position in superposed relation below an article support, positioning articles in predetermined location adjacent one edge of said article support, and moving the articles so positioned from adjacent said support and onto said support to form a load of articles thereon and at the same time moving the load of articles and the pallet in the same direction and at the same rate until both the load and the pallet are moved beyond the support and the load is on the pallet.

9. In a pallet loading machine, pallet support means, a load receiving stripper plate freely pivotable about a fixed axis and engageable with a pallet on said pallet support means to limit downward pivotal movement of the stripper plate, an article conveyor along one side of said stripper plate and arranged to deliver articles into position adjacent said stripper plate, and ram means operable to advance articles positioned on said article conveyor from the conveyor and onto said stripper plate.

10. In a pallet loading machine, pallet support means, pivotally mounted load receiving means having cooperating tines arranged to receive the load thereon, said load receiving means being adapted for movement toward and away from said pallet support means, counterbalance means associated with said load receiving means and adapted to resiliently hold said load receiving means in a position pivoted away from said pallet support means, and reciprocable means engageable with both the load and the pallet for effecting simultaneous movement thereof in a common direction away from said load receiving means to thereby transfer the load from said load receiving means to the pallet.

11. In a pallet loading machine, pallet support means, pivotally mounted load receiving means disposed in spaced superposed relation above said pallet support means, said load receiving means being adapted for movement toward and away from said pallet support means, an arm projecting from said pivotally mounted load receiving means, spring means connected to the distal end of said arm and adapted to resiliently hold said load receiving means in a position pivoted away from said pallet support means, and reciprocable means engageable with both the load and the pallet for effecting simultaneous movement thereof in a common direction away from said load receiving means to thereby transfer the load from said load receiving means to the pallet.

12. In a pallet loading machine the combination of a load receiving stripper plate pivotally mounted upon a fixed axis for vertical movement from a raised position, load delivery means located at substantially the height of said stripper plate when in its raised position, counterbalance means associated with said load receiving stripper plate and arranged to resiliently retain said stripper plate in raised position preparatory to receiving a load thereon, and load engaging means mounted for reciprocatory movement over said load delivery means and said stripper plate to advance a load from said load delivery means onto said stripper plate.

13. In a pallet loading machine, load receiving means pivotally mounted for vertical movement, article delivery means having a fixed height and disposed laterally adjacent said load receiving means, a spring associated with said load receiving means and adapted to resiliently support said load receiving means in predetermined position at the height of said article delivery means preparatory to receiving a load, and a reciprocably mounted article engaging means movable across said article delivery means to move articles therefrom onto said load receiving means.

14. In a pallet loading machine, a load receiving stripper plate mounted for vertical movement, resilient counterbalance means associated with said stripper plate and arranged to yieldably retain the stripper plate in a raised position preparatory to receiving a load thereon, pallet receiving means located beneath said stripper plate and adapted to support a pallet at a predetermined height in spaced relation to said stripper plate when in raised position, downward movement of the stripper plate under the influence of a load thereon being limited by engagement of the stripper plate with a pallet in position therebelow on said pallet receiving means, and load engaging means mounted for reciprocatory movement across said stripper plate.

15. In a pallet loading machine, load receiving means mounted for vertical movement, article delivery means disposed at a certain height laterally adjacent said load receiving means, resilient counterbalance means associated with said load receiving means to yieldably support the same in a raised position at substantially the height of said article delivery means, pallet receiving means located beneath said stripper plate and adapted to support a pallet at a certain height in spaced relation to said load receiving means when in raised position, downward movement of the load receiving means under the influence of a load thereon being limited by engagement of the load receiving means with a pallet in loading position therebelow on said pallet receiving means, and reciprocably mounted article engaging means movable across said article delivery means to move articles therefrom onto said load receiving means.

16. In a pallet loading machine, a load receiving stripper plate resiliently mounted to oppose downward movement from a particular height under the influence of a load thereon, article delivery means disposed laterally adjacent said stripper plate at said particular height, means associated with said article delivery means for aligning articles thereon with said load receiving stripper plate, and reciprocably mounted article delivery means arranged to move articles from said article delivery means onto said stripper plate.

References Cited in the file of this patent

UNITED STATES PATENTS

| | | |
|---|---|---|
| 1,044,500 | Converse | Nov. 19, 1912 |
| 1,568,082 | Mitton | Jan. 5, 1926 |
| 1,954,842 | Ranney et al. | Apr. 17, 1934 |
| 2,442,250 | Spain | May 25, 1948 |
| 2,542,330 | Henderson et al. | Feb. 20, 1951 |
| 2,613,021 | Bowes | Oct. 7, 1952 |
| 2,633,251 | Bruce | Mar. 31, 1953 |